United States Patent [19]

Papadopoulos

[11] Patent Number: 4,778,037

[45] Date of Patent: Oct. 18, 1988

[54] VIBRATION OR SHOCK ISOLATORS WITH TENSION AND COMPRESSION SPRINGS ARRANGED EQUIANGULARLY IN A ROSETTE

[76] Inventor: Demetrios G. Papadopoulos, 9 Ennerdale Road, Kew Gardens, Richmond, Surrey, United Kingdom

[21] Appl. No.: 141,698

[22] Filed: Jan. 7, 1988

[51] Int. Cl.$^4$ .............................. F16F 7/10; F16F 1/06
[52] U.S. Cl. ..................................... 188/378; 248/576; 248/603; 267/136; 267/140.2; 267/140.5; 267/166; 188/380
[58] Field of Search ................. 267/136, 137, 166–180, 267/259, 289, 286, 151, 140.3, 140.4, 140.5, 140, 140.2; 248/575, 576, 577, 566, 573, 636, 562, 582, 605, 603, 555, 556, 578; 188/378–380

[56] References Cited

U.S. PATENT DOCUMENTS

| | | | |
|---|---|---|---|
| 3,022,832 | 2/1962 | Marindin | 267/168 X |
| 3,230,295 | 1/1966 | Short | 188/380 X |
| 3,858,925 | 1/1975 | Gaydecki | 267/140 X |
| 3,906,689 | 9/1975 | Nakayama | 267/136 X |
| 4,033,566 | 7/1977 | Petersen | 267/136 X |
| 4,101,008 | 7/1978 | Frosch et al. | 188/380 |
| 4,206,898 | 6/1980 | Salter | 248/578 X |
| 4,365,770 | 12/1982 | Mard et al. | 188/380 X |
| 4,372,431 | 2/1983 | Desjardins | 188/380 |
| 4,405,101 | 9/1983 | Carlson et al. | 188/380 X |
| 4,494,634 | 1/1985 | Kato | 188/380 |
| 4,511,115 | 4/1985 | Ludwigser | 188/380 X |
| 4,557,459 | 12/1985 | Lindsay | 248/576 X |
| 4,565,039 | 1/1986 | Oguro et al. | 267/140.5 X |
| 4,613,119 | 9/1986 | Hardtke | 267/178 X |
| 4,640,487 | 2/1987 | Salter et al. | 267/140.2 X |
| 4,653,736 | 3/1987 | Pontoppidan | 267/177 X |

Primary Examiner—Douglas C. Butler
Attorney, Agent, or Firm—Fishman, Dionne & Cantor

[57] ABSTRACT

An isolator includes a load bearing part arranged for deflection against the action of a series of compression springs and tension springs whose axes are pivotal with respect to the axis of deflection. The arrangement is such that the isolator can operate in a range in which an incremental increase in deflection causing compression of springs is such as to result in an incremental decrease in the restoring force of springs resolved along the deflection axis. The tension springs produce an increasing restoring force throughout this range, and the net result is a load/deflection performance in which a region of zero or near zero stiffness of the entire system, along the deflection axis, is provided, bounded by regions of positive stiffness.

6 Claims, 4 Drawing Sheets

VIBRATION OR SHOCK ISOLATORS WITH TENSION AND COMPRESSION SPRINGS ARRANGED EQUIANGULARLY IN A ROSETTE

This specification relates to vibration or shock isolators.

There is frequently a need for a mechanical vibration isolator which will provide a very high level of isolation from e.g. random ambient vibrations. Such a need arises, for example, in the mounting of scientific instruments, precision balances, gramophone turntables and so forth. The vibrations which must be accommodated may have a very broad bandwidth with lower frequencies below 5 Hz.

The transmissibility of an isolator can be defined as the ratio of the force or displacement transmitted by the isolator to the corresponding force or displacement to which it is subjected. For the most effective isolation the transmissibility would be a minimum, and ultimately zero. Considering a simple, theoretical isolator such as a conventional linear spring, there exists a relationship between the frequency ratio, damping ratio and transmissibility of the system. The frequency ratio is the ratio of the excitation frequency to the natural undamped frequency of the isolator system, whilst the damping ratio is the ratio of the actual damping in the system to the critical damping (i.e. the damping which causes vibrations to decay in the minimum time).

The relationship between the three factors is such that, at a frequency ratio of unity—where resonance of the system occurs—the transmissibility is at a maximum. This maximum is controlled by the damping ratio and is reduced as this ratio increases. For all frequency ratios up to a theroetical value of $\sqrt{2}$, the transmissibility is above unity. Above that value, the transmissibility is less than unity and decreases with increasing frequency ratio. The rate of decrease of transmissibility in this region, is less with increasing damping ratio for initial frequency ratios but eventually evens out as frequency ratios increase.

It will be apparent from this, that a suitable way of minimising transmissibility is to increase the frequency ratio, by decreasing the natural frequency of the isolator, with due consideration for the spectrum of excitation frequencies and possible proximity to resonance. There are, however, practical considerations which limit the extent to which the natural frequency of e.g. a conventional linear spring can be reduced. Considering such a system, without damping, it can be shown that the natural frequency is a function of the static deformation under the action of a load. This relationship is such that for low natural frequencies, unacceptably high deflections are involved. The following table illustrates this, in the case of a linear isolator excited by a frequency of 3 Hz.

TABLE

| Natural Frequency Hz | Static Deflection Under Load mm | Transmissibility % |
|---|---|---|
| 2 | 62 | 80 |
| 1 | 249 | 12.5 |
| 0.75 | 442 | 6.7 |
| 0.50 | 994 | 2.9 |

A solution commonly adopted is to introduce damping so that natural frequencies are reduced to practical levels and the damping controls resonance and reduces transmissibility at low frequency ratios. However, such a solution is inevitably a compromise. Heavy damping may not be acceptable for systems which must cope with high acceleration or shocks. Furthermore, for frequency ratios above the theoretical value of $\sqrt{2}$, increased damping has a counter-productive effect since, as mentioned earlier, the rate of decrease of transmissibility is reduced.

It is therefore proposed to approach the problem by so designing an isolator that it has an operating region where it behaves with much reduced stiffness—and even zero stiffness. The stiffness can be defined as $K=dL/dH$ where L is the applied load and H is the deflection. When K tends to zero, the natural undamped frequency tends to zero and the frequency ratio tends to infinity. Thus, in this operating region the transmissibility will have a theoretical value tending to zero, for zero damping.

For stability, the system should be such that either side of this operating region the stiffness increases, i.e. $K>0$, otherwise the system will be unstable.

There has been proposed a shock mounting designed to protect equipment against shock e.g. when being dropped which exhibits a similar behaviour. Reference is made to "Theoretical and Experimental Investigation of Buckling Shock Mount", C. E. Crede and Sheldon E. Young, "Proceedings Of The Society For Experimental Stress Analysis". Volume V, No. 2, 1948, at page 144.

In this arrangement, the mount comprises a hollow cylindrical rubber element having a wall of non-uniform thickness, which can be made to buckle under an applied axial load. The initial behaviour of the mount is determined by the properties of the rubber cylinder in compression, and the deflection increases with increasing load. When buckling takes place, the load remains substantially constant as deflection increases. After a certain amount of further deflection, the rubber of the inwardly buckled cylinder wall again undergoes compression as the two halves—either side of the buckling line—come into contact with each other. Thus, effectively there are three different systems which successively provide a desired load/deflection behaviour.

Such a mount has a number of disadvantages, such as difficulty of design, limited application, lack of adjustment and so forth. Furthermore, the rubber possesses significant natural damping which may be undesirable at least in some contexts. Whilst the mount may be of use in the isolation of shock in specific situations, it has not been proposed for the isolation of vibrations, where it would be inefficient.

Accordingly, it is now proposed to achieve a Load/Deflection behaviour of the type mentioned above—which has a region of zero or near zero stiffness between regions of positive stiffness—but by the superposing of two systems. One of the systems exhibits a transition from positive to zero stiffness but subsequently performs as if it has negative stiffness, i.e. the load decreases with increasing deflection. Onto this first system is superposed a second system which may exhibit positive stiffness throughout. This second system preferably exhibits increasing positive stiffness with increasing deflection, and could for example be in the form of a non-linear compression or tension spring, or a linear tension spring whose axis is inclined to the direction of the load. The first and second systems could each be comprised of discrete sub-systems.

The result of superposing the two systems is that there is positive stiffness for a first range of deflections, being the sum of the contributions of the two systems. Where the first system exhibits zero or negative stiffness, at higher deflections, the net effect will depend on the difference between the positive stiffness of the second system and the negative stiffness of the first. The parameters are so chosen that there will be a region of zero and/or near zero stiffness, followed by a region of positive stiffness. Thus, the effect of the second system should not be so great, initially, as to prevent zero or near zero stiffness being achieved. However, after the zero or near zero stiffness region, the effect should increase at a sufficient rate to counteract the increase of negative stiffness in the first system. It is for this reason that non-linear behaviour of the second system is desirable. It will be appreciated that, in contrast to the known mount, an isolator in accordance with the above concepts has two systems which may act concurrently rather than consecutively. However, the load/deflection characteristics of the individual systems can be substantially varied to produce an overall system with a wide range of characteristics as desired.

The first system could be in a number of forms, but preferably it is based on a compression spring whose axis is inclined to the direction in which the load is constrained to move. With such an arrangement, deflection of the load along its direction causes compression of the spring and at the same time the angle between the spring axis and the load direction changes. With increasing deflection along the load direction, there is an increased restoring force along the axis of the spring but this has to be resolved along the load direction. A point is reached where the effect of the change in angle, tending to reduce the component of restoring force along the load direction, exceeds the effect of increase in the restoring force from compression of the spring. Thus, there is a transition from positive to negative stiffness of this first system, the positive stiffness decreasing to the transition point and then the negative stiffness increasing.

A practical embodiment could involve a "rosette" of three equi-angularly spaced compression springs forming the first system so as to provide mechanical stability. Other arrangements could be used, for example with only one or two, or with four or more springs. The second system could be in the form of three equi-angularly spaced tension springs, although again, other numbers and arrangements would be possible.

In general, it is preferred that the elements of the isolator—and particularly those of the first system—should be simple mechanical elements such as the springs mentioned above, rather than elements whose behaviour is brought about by material limitations or structural instability such as yield, or buckling or other elastic instabilities of struts, plates, shells and the like. Nevertheless, a number of such arrangements might be useable in certain circumstances.

By superposing two systems as described above, it is possible to employ simple mechanical elements, such as springs, whose mechanical behaviour can be calculated readily. Thus, design of an isolator for a particular purpose can be readily achieved. Furthermore, there is the possibility of having an isolator of variable performance, for example by adjusting its geometry, spring tensions and so forth. The mechanical elements can, if desired, have a natural damping well below that of rubber used in the known mount, so that the choices for damping can depend on a particular application and can be a minimum, or higher by the use of separate damping means.

Viewed from one aspect, the present disclosure provides a shock or vibration isolator for a load capable of deflection in a given direction, comprising two superposed systems, the first of which exhibits positive stiffness along said direction and the second of which exhibits negative stiffness along said direction.

Viewed from another aspect, the present disclosure provides a shock or vibration isolator in which the relationship between load and deflection along a particular direction is such as to provide two regions of positive stiffness interconnected by a region of much reduced stiffness, comprising two superposed systems, the first of which exhibits positive stiffness along said direction and the second of which exhibits negative stiffness along said direction.

Viewed from a still further aspect, the present disclosure provides a shock or vibration isolator comprising a load bearing portion arranged for deflection along an axis, a compression spring acting between said load bearing portion and a base, the spring axis being disposed at an angle to the deflection axis and being pivotal with respect to said load bearing portion and said base whereby said angle varies with deflection of the load bearing portion, the arrangement being such that the isolator can operate in a range in which an incremental increase in deflection of the load bearing portion along the deflection axis and generally towards the base is accompanied by an incremental decrease in the value of the restoring force of the compression spring resolved along the deflection axis, the isolator further comprising a second spring system acting on said load bearing portion and which in said range provides an incremental increase in restoring force, resolved in the direction of the deflection axis, with said incremental increase in deflection of the load. Preferably the second spring system comprises a tension spring which acts between the load bearing portion and a second base, the spring axis being disposed at an angle to the deflection axis and being pivotal with respect to said load bearing portion and said second base whereby said angle varies with deflection of the load bearing portion, the arrangement being such that in said range, incremental increases in deflection of the load bearing portion along the deflection axis and generally towards the first base are accompanied by successively larger incremental increases in the value of the restoring force of the tension spring resolved along the deflection axis.

Reference will now be made to the accompanying drawings which illustrate some of the above concepts as well as a practical arrangement, and in which.

Figure 1:
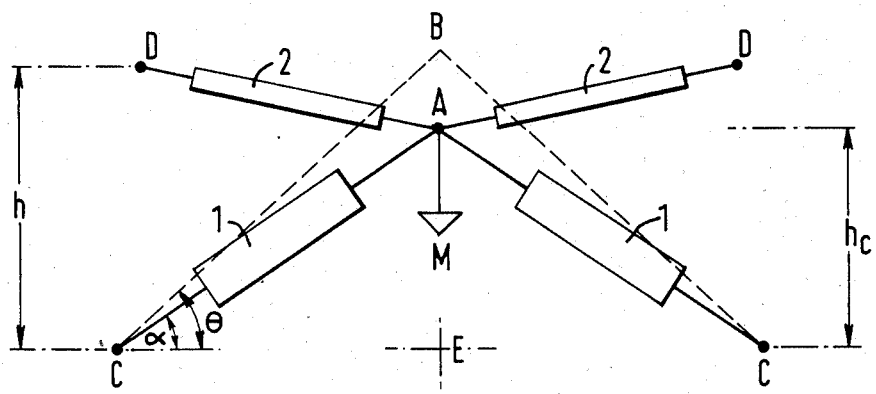
FIG. 1 is a diagrammatic side elevation of an isolator system.
Figure 2:
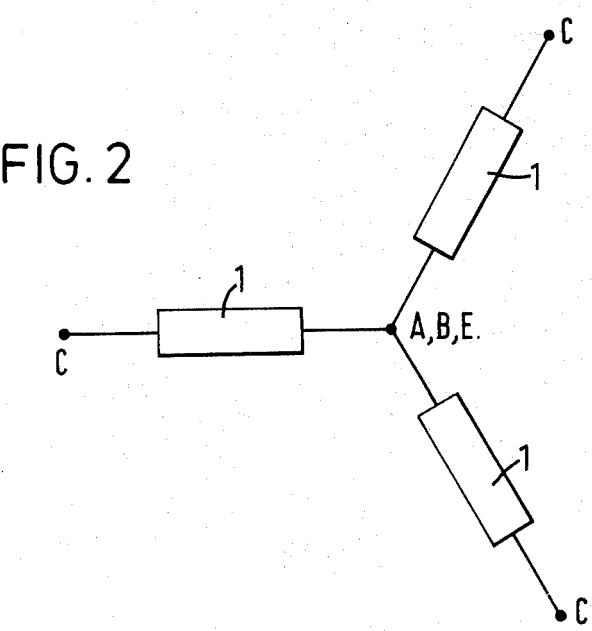
FIG. 2 is a diagrammatic plan view of the lower part of the same system.

Referring now to FIGS. 1 and 2, the isolator comprises a first system of three identical compression springs 1 arranged equi-angularly in a rosette. The springs are upwardly inclined acting between points C and a point A where a load M is supported, the load acting downwardly in the direction of the arrow towards point E. Thus lines AC represent the axes of springs 1, and line AE represents the direction of the load M. Each line AC forms an acute angle with the line AE. Points C and E lie in the same plane.

Point B represents the rest position of the isolator, with no load M, and the dotted lines CB indicate the direction of the axes of springs 1 in this state. Obviously, springs 1 undergo compression when load M is applied and they move from CB to CA.

At the rest, or zero load position, the angle BCE is $\theta$. Under the applied load M, at the equilibrium state, the angle ACE is $\alpha$. It can be shown that, for this system acting alone, the maxium load will be sustained, when $\overline{\alpha}$ reaches a critical value $\alpha$ at which:

$$\alpha = \cos^{-1}[\sqrt[3]{\cos\theta}] \quad (1)$$

At this critical angle $\alpha$, the first system passes from positive stiffness ($\alpha > \overline{\alpha}$) to negative stiffness ($\alpha < \overline{\alpha}$).

A second system comprises three identical tension springs 2 arranged equiangularly in a rosette above springs 1, although being displaced by 60° from springs 1. These springs 2 act between points D (which are in the same plane) and the point A where load M is supported and always act under tension so as to have positive stiffness.

Considering now the combined system the relationship between load M and the distance AE, i.e. $h_c$ is given by the following formula:

$$m = 3Lk_c\left[\frac{1}{\sqrt{1 + C_1^2 h_c^2}} - \cos\theta\right]C_1 h_c + 3fk_t\left[\mu - \frac{\mu}{\sqrt{1 + \mu^2}}\right] + 3T\mu \quad (2)$$

in which:

$$C_1 = \frac{1}{d_c} \quad (3)$$

$$\mu = \frac{h - h_c}{\left(f + \frac{T}{k_t}\right)} \quad (4)$$

and:

L = free length of compression springs 1, i.e. distance CB
$k_c$ = stiffness of compression springs 1 (load per unit length)
$d_c$ = distance CE
f = free length of tension springs 2
$k_t$ = stiffness of tension springs 2 (load per unit length)
h = distance between the respective planes containing points C and D T = initial spring tension of the extension spring rosette, with the compression rosette and any load removed.

The overall stiffness of the system K, relative to $h_c$, i.e. $(dm)/dh_c$, is given by the equation:

$$K = 3k_c\left[LC_1\left[\frac{1}{\sqrt{(1 + C_1^2 h_c^2)}} - \frac{C_1^2 h_c^2}{\sqrt{(1 + C_1^2 h_c^2)^3}}\right] - 1\right] + \left[3fk_t\left[1 + \frac{\mu^2}{\sqrt{(1 + \mu^2)^3}} - \frac{1}{\sqrt{(1 + \mu^2)}}\right] + 3T\right]\left[\frac{-1}{\left(f + \frac{T}{k_t}\right)}\right] \quad (5)$$

It will be seen by inspection that the first part of the right hand side of equations (2) and (5) relates to the behaviour of the compression spring rosette whilst the remainder relates to the extension spring rosette. For arrangements using different numbers of springs the factor 3 in the equations would be replaced by the appropriate number.

The constants in the above equations which would relate to a particular design will be chosen so that the isolator exhibits the required load/deformation characteristics. For K=O, the first part of equation (5) must equal the second part, and this will dictate the relationship between the isolator constants for this to be achieved.

Figure 3:
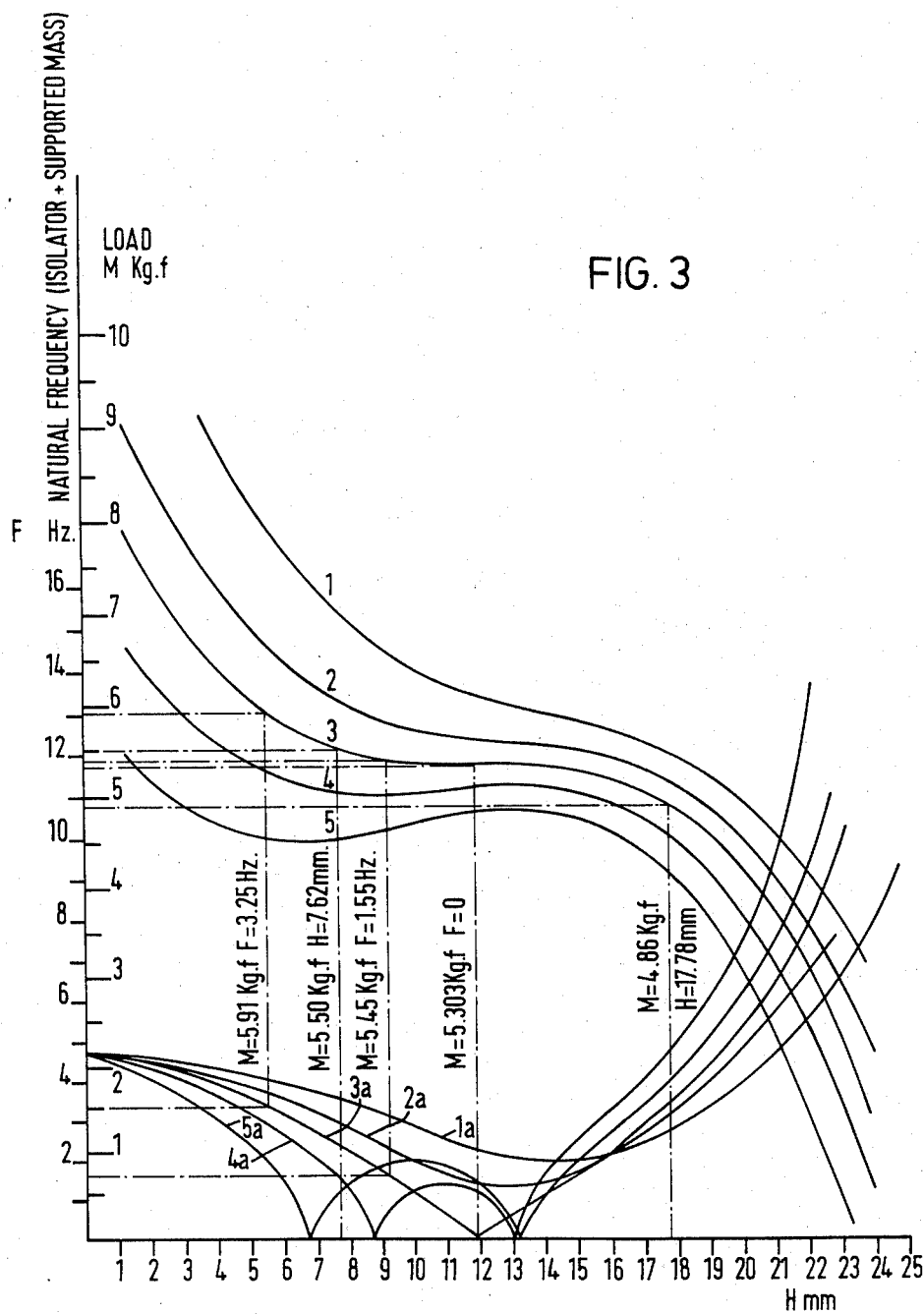
FIGS. 3 and 4 are graphs showing various performance characteristics of the isolator system.
Figure 4:
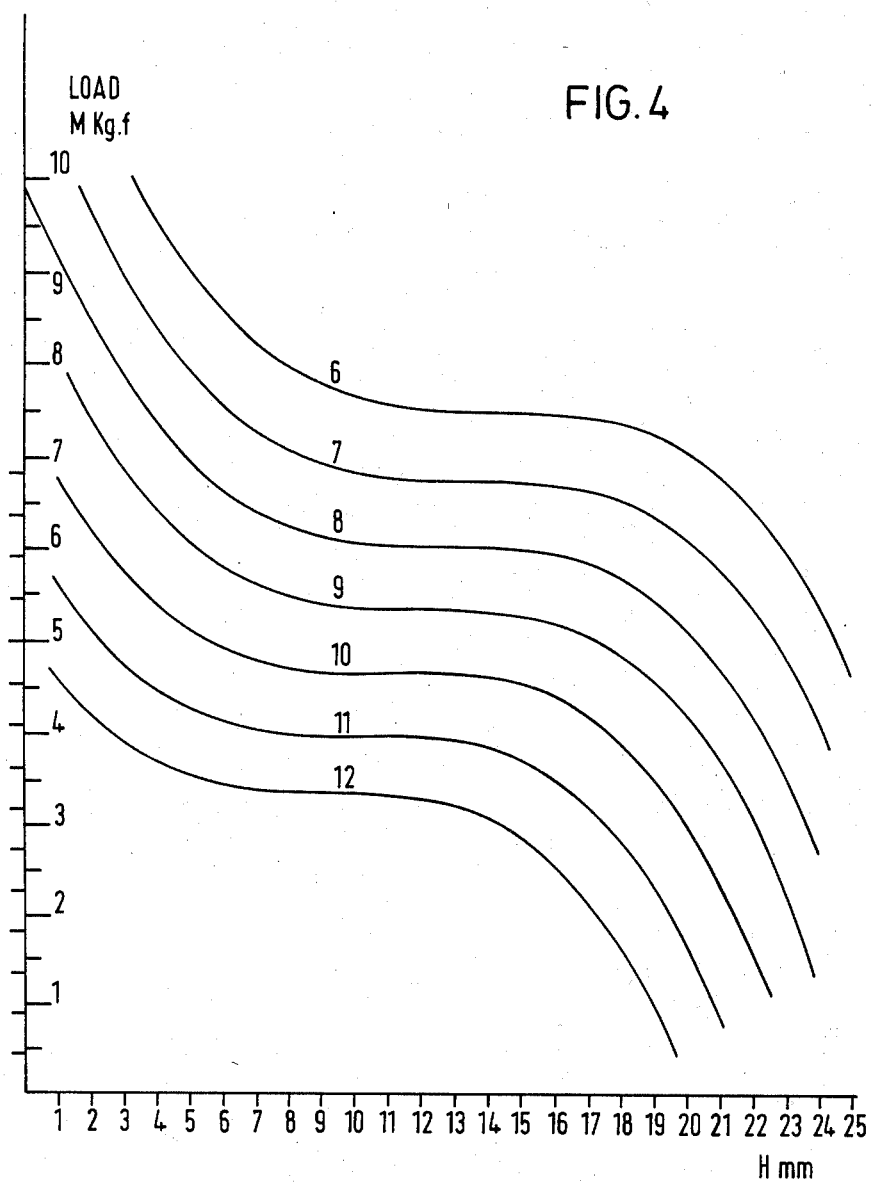

FIGS. 3 and 4 are graphs showing performance curves for the above system under various configurations of the same physical structure.

Curves 1 to 5 on FIG. 3 show the load/deflection characteristics for five different configurations. It will be seen that, of these, curve 3 represents the optimum performance with a region over which K, i.e. (dM)/dH, is zero or near zero, and positive stiffness either side of this region (it being remembered that for this model, h is measured upwardly, i.e. in the opposite direction to the direction in which the load acts). Curve 3 thus represents the behaviour of a system designed to carry a load of 5.303 Kg.f, i.e. the load corresponding to K=O.

The curves 1, 2, 4 and 5 show departures from the ideal, by varying the configuration, whilst there are also marked lines indicating the effect of varying the load for the configuration of curve 3.

Curves 1a to 5a are corresponding plots of the natural frequencies of the various configurations, assuming zero damping, with curve 3a representing ideal behaviour. As will be seen, at the point where K=O, i.e. for a load of 5.303 Kgf, the natural frequency is zero.

By suitably modifying or adjusting the systems, optimum performance, such as that illustrated by curves 3 and 3a, can be obtained for any chosen load within the range of the systems.

Curves 6 to 12 on FIG. 4 show how it is possible to obtain optimum perforamnce with near zero transmissibility for different supported mass values with suitable adjustment. Infinite adjustment is possible between the limits of curves 6 and 12.

Figure 5:
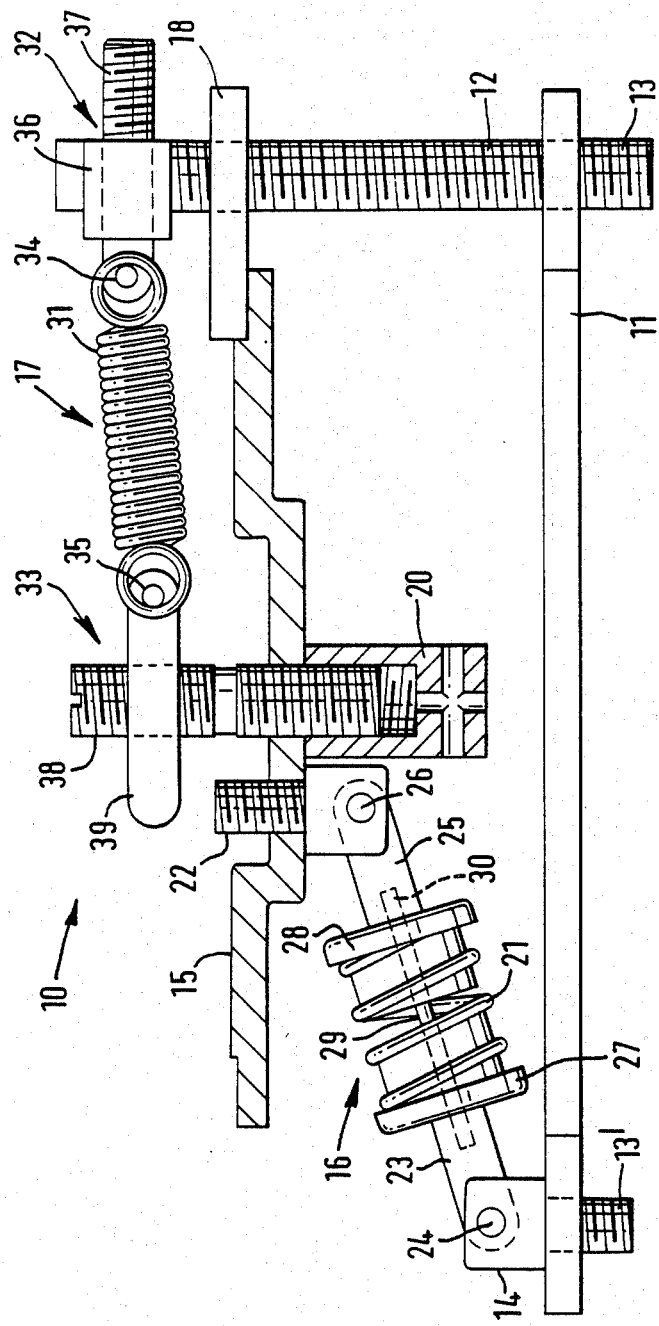
FIG. 5 is a partial side elevation of a practical embodiment of the isolator system shown diagramatically in FIGS. 1 and 2.

Referring now to FIG. 5, there is shown a physical embodiment of an isolator 10 in accordance with the above concepts. The isolator is constructed from steel, brass and other suitable engineering materials.

The isolator 10 comprises a base in the form of an annular member 11. Positioned at 120° intervals around this member 11 are three posts 12, only one of which is shown. The posts project through the member 11 to provide feet 13. Also positioned at 120° intervals around member 11, but offset by 60° from posts 12, are lugs 14. These also extend through the member 11 to provide feet 13'.

A circular load carrying plate 15 is held in place by a compression spring rosette, generally indicated at 16, and a tension spring rosette, generally indicated at 17. An annular stop member 18 is adjustably mounted on posts 12 and engageable with a recess 19 around the circumference of plate 15. For this example, the plate carries a member 20 from which a load can be suspended for test purposes. For more practical examples, the load could be transmitted to the plate 15 by any suitable means.

The compression spring rosette includes three coil springs 21 (only one of which is shown) each connected between a respective lug 14 and a corresponding lug 22 mounted on the plate 15. This is achieved by means of a lower spring support 23 pivotally connected at 24 to lug 14 and an upper spring support 25 pivotally connected to lug 22 at 26. The spring supports 23 and 25 have cups 27 and 28 respectively, to receive the ends of coil spring 21.

Since a coil spring in compression can be laterally unstable, support 23 has an extension pin 29 which is telescopically engaged in an axial bore 30 in spring support 25. This provides stability although it may introduce friction which will provide undesired damping. It may be preferable therefore to use compression springs with appropriate geometric ratios such that they are laterally stable under operating conditions.

The extension spring rosette includes three coil springs 31 (only one of which is shown) each connected between a respective adjustable mounting 32 on post 12 and a central turret 33 on plate 15. The ends of the springs 31 are looped round pins 34 and 35 on the mounting and turret respectively. The mounting 32 includes a stationary threaded member 36 mounted on the post 12 receiving an axially movable threaded member 37, carrying the pin 34. Thus, the initial tension of spring 31 can be set. If desired, the compression springs 29 could also be adjustable by means of e.g. screw adjustments of their supports.

The central turret 33 comprises a differential threaded arrangement for coarse and fine height adjustment, including a screw 38 and a disc 39, which carries pins 35. Thus, the overall height can be adjusted.

The geometrical ratios, spring parameters and initial tensions are set so as to give a behaviour such as that shown in curve 3 on the graph of FIG. 3, using the formulae set forth above although empirical adjustments can also be made.

In a particular construction, the following values were used:

$L = 2.063$ ins.
$k_c = 20.727$ lbs.f/in.
$d_c = 1.449$ ins.
$f = 1.153$ ins.
$k_t = 79.367$ lbs.f/in.
$h = 0.580$ ins.
$T = 4.517$ lbsf.

Then, for $h_c = 0.478$ ins, the load $m = 5.303$ kg. $dm/dh_c = 0.04$. Thus, there is a region of near zero stiffness for this load so that vibration transmissibility will be minimised. This is shown on the graph of FIG. 3.

Modifications of the above embodiment and of the broad aspects disclosed herein may be apparent to those skilled in the art.

The model as described is passive and in a simple form. As such it is dependent, for optimum performance, on operating at a supported mass value which is close to that for which the particular model has been designed and/or configuration has been set. In situations where the value of the supported mass remains constant during service—though adjustable between service intervals if necessary—such as in the situation for which the above model has been designed, this basic model will suffice. In situations where the value of the supported mass can vary during service—such as vehicle suspension—the above model has demonstrated the wide range of load values within which a single physical isolator can be configured to operate at optimum performance, and it is envisaged that, in that instance, configuration adjustment could be effected automatically with passive or active servos.

Depending on the particular apolication, this type of isolator could perform either by itself or in conjunction with conventional or similar isolators. A very promising area however to be looked at will be where two or more isolators as described, to the same, similar or different design parameters, work together in either a 'compound' or 'stack' format. Compound isolators would be difficult to describe without a detailed account of the basic isolator. The performance of a stack however is much easier to appreciate with reference to the previous discussion. A stack of isolators could cater for larger excitation amplitudes without loss of performance and/or a varying supported mass.

So far, the discussion above has been confined to isolation of vibrations related to mass i.e. essentially gravitational. However, another application would be where two isolators are 'compressed' together with a common force which would normally produce say near-zero stiffness in both isolators, such as simply bolting the two isolators together This would create a common boundary plane in neutral equilibrium. This configuration could be used for isolating shock or vibration against inertial rather than gravitational forces.

With reference at least to the preferred embodiment, the system decribed is such that a clear distinction exists between it and e.g. the earlier shock mount referred to above. Such a known system exhibits similar load/deflection characteristics. However, the system described herein does not depend upon any material or structural instability or failure. The behaviour of the system depends solely on the basic simple laws of static equilibrium. It can be fully assessed and quantified at design stage.

I claim:

1. A shock or vibration isolator comprising a load bearing portion arranged for deflection along an axis; a tension spring acting between the load bearing portion and a base, the spring axis being disposed at an angle to the deflection axis and being movable relative to the load bearing portion and the base whereby the angle varies with deflection of the load bearing portion and the tension spring exhibits increasing positive stiffness along the deflection axis with deflection of the load bearing portion in a particular direction in an operating region of the isolator; and a compression spring acting between the load bearing portion and a base, the compression spring being disposed at an angle to the deflection axis and being movable relative to the load bearing portion and the base whereby the angle varies with deflection of the load bearing portion and the arangement being such that the compression spring exhibits increasing negative stiffness along the deflection axis with deflection of the load bearing portion in said particular direction in said operating region of the isolator; wherein the arrangement is such that in said operating region the resultant of the increasing positive stiffness of the tension spring and the increasing negative stiffness of the compression spring is a substantial region of zero or near zero stiffness, and that at each end of said substantial region of zero or near zero stiffness there is a region of increasing positive stiffness in the respective directions away from said substantial region.

2. An isolator as claimed in claim 1, wherein there is a plurality of said compression springs and said tension springs disposed around the load bearing portion.

3. An isolator as claimed in claim 2 wherein said compression springs and tension springs act so as to support and constrain the load bearing portion for deflection along the deflection axis.

4. An isolator as claimed in claim 2 wherein there are at least three each of said compression springs and tension springs.

5. An isolator as claimed in claim 1 wherein the characteristics of the isolator are adjustable by means of varying the initial lengths of the compression and/or tension springs.

6. An isolator as claimed in claim 3 wherein there are at least three each of said compression springs and tension springs.

* * * * *